United States Patent [19]
Kern et al.

[11] 3,924,011
[45] Dec. 2, 1975

[54] PROCESS OF TEXTURIZING MEAT MATERIAL

[75] Inventors: Jean-Paul Kern, Pfulgriesheim; Jacques Lemarechal, La Source; Malcolm Desforges, Dingsheim, all of France

[73] Assignee: Unisabi S.A., Strasbourg-Neudorf am Rhine, France

[22] Filed: Aug. 23, 1973

[21] Appl. No.: 390,795

[30] Foreign Application Priority Data
Aug. 24, 1972  France .............................. 72.30191

[52] U.S. Cl. ................ 426/518; 426/104; 426/513; 426/645
[51] Int. Cl.² ............................................ A23L 1/31
[58] Field of Search ........... 426/149, 272, 393, 513, 426/518, 104, 645

[56] References Cited
UNITED STATES PATENTS

| | | | |
|---|---|---|---|
| 2,046,118 | 6/1936 | Gurney | 426/149 |
| 2,228,414 | 1/1941 | Spang | 426/149 |
| 2,673,156 | 3/1954 | Minder | 426/513 |

Primary Examiner—Hyman Lord
Attorney, Agent, or Firm—Davis, Hoxie, Faithfull & Hapgood

[57] ABSTRACT

A process of texturising of meat not possessing the naturally fiberous surface texture of natural muscular tissue, mixtures of such meat and/or offal, and other meat substances intended for animal or human consumption is effected by producing on the surface of the material one or more series of incisions imparting to the treated products an appearance resembling that of good quality beef. The process has application to canned foodstuffs for animals and also use in uncanned foodstuffs for animals or even humans.

5 Claims, 2 Drawing Figures

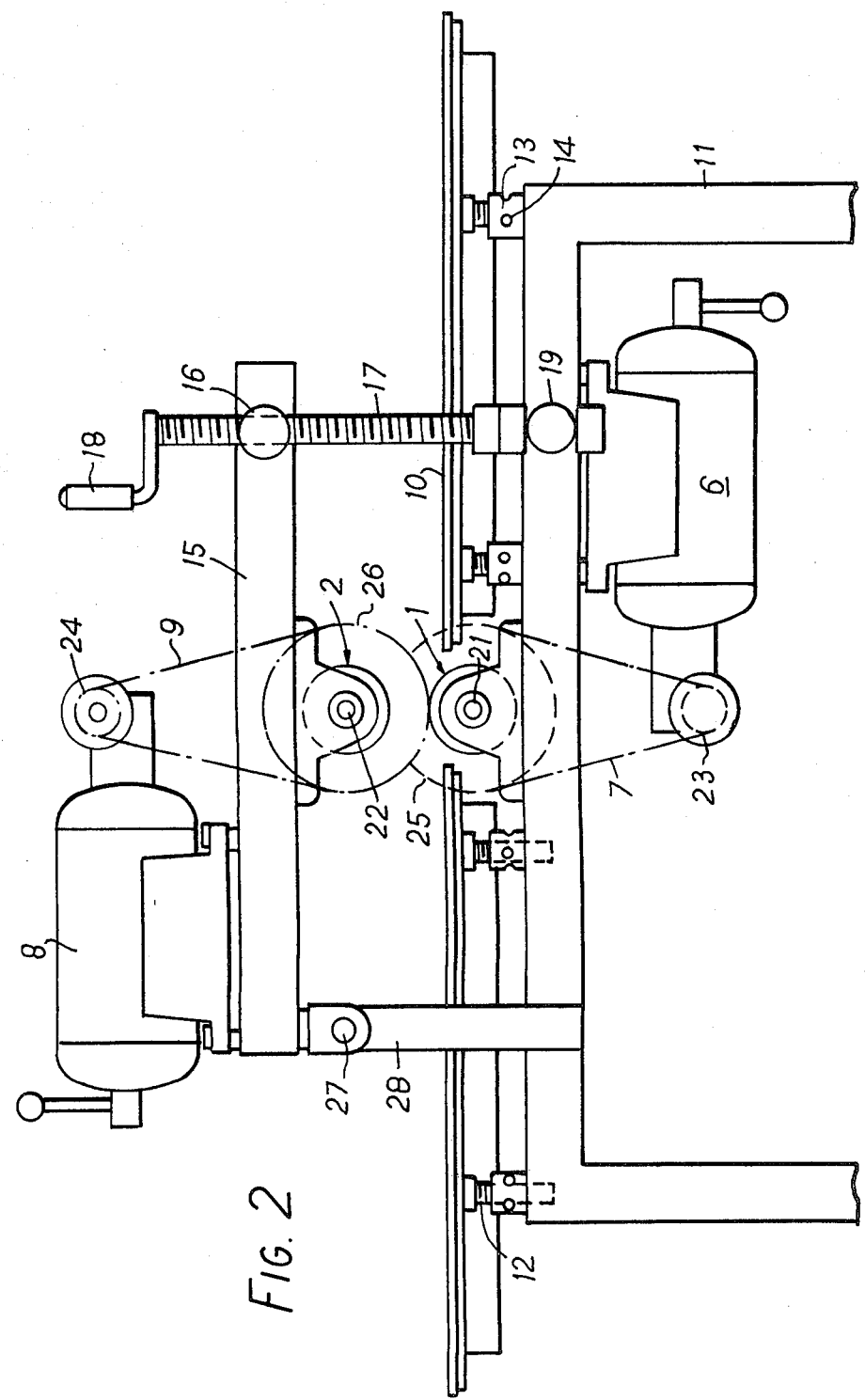

PROCESS OF TEXTURIZING MEAT MATERIAL

It is known that the growing demand for high-quality meat has resulted in the development of substitute products used either as such or in admixture in recipes comprising meat.

The substitute products certainly have generally suitable acceptability but none of them possesses the desired appearance of good quality beef.

When the substitute products are intended for human consumption, it is important to attain the same taste, the same texture, the same odour and the same appearance as those of the beef used in the product if these substitute products are to be accepted by the users. If, on the contrary, the substitute product is intended for animals such as dogs or cats, the fact that the product has the same appearance and the same odour as those of beef is sufficient, because the user merely empties the product into the animal's bowl.

It is the object of the invention to confer an appearance very close to that of beef, that is to say, of muscular tissue, on substances not possessing a naturally fibrous texture, such as offal, mixtures of meats or meats and offal or other meat proteinaceous compositions by a treatment such that these substances become identical in appearance to beef when they are presented to the consumer.

According to the invention, this object is attained by a process of texturising the surface of meat not possessing a naturally fibrous texture, mixtures of such meat and/or offal and meat substances by providing on their surface a series of incisions conferring on the treated products an appearance similar to that of good quality beef.

According to a preferred feature of the invention, surface texturising is produced by a series of lines of incision parallel to one another.

According to another preferred feature of the invention, surface texturising is produced by intersecting series of lines of incision parallel to one another.

In practice, the incisions may be produced by apparatus of various types, comprising for example series of rotating circular knives or plane-parallel knives mounted in fixed, movable or vibrating supports.

One embodiment of an apparatus for carrying out the process of the invention is described in the following and is shown diagrammatically, by way of example only, in the accompanying drawings, in which:

FIG. 2 is a side elevation of the apparatus of FIG. 1.

Figure 1:
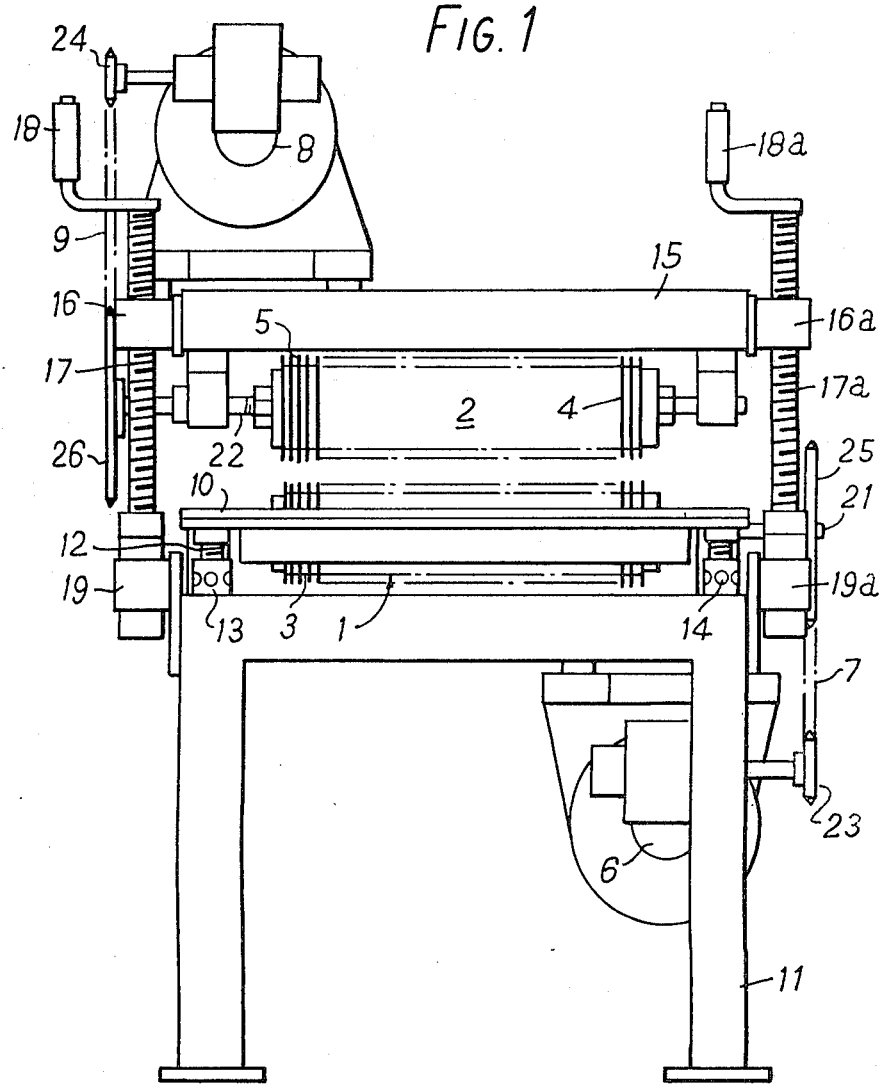
FIG. 1 is a front elevation of an apparatus having circular knives.

The apparatus as shown in the drawings, and by means of which the process of the invention can be carried out, includes a lower roller 1 and an upper roller 2 producing the series of incisions on the lower face and upper face, respectively of the product to be texturised.

These rollers each comprise, mounted and locked on respective central shafts 21 and 22, a series of cutting discs or circular knives, 3 and 4 respectively, separated by flexible annular spacers 5, for example of polytetrafluoroethylene.

The lower roller 1 is driven from a motor 6 by means of a sprocket wheel 23, a chain 7 and a sprocket wheel 25 keyed on the shaft 21, while the upper roller 2 is driven independently by a motor 8, a sprocket wheel 24, a chain 9 and a sprocket wheel 26 keyed on the shaft 22.

The product to be treated is placed on a table 10 which is supported on the frame 11 of the machine by means of screws 12, and adjustment may be effected by captive nuts 13, which may be turned in known manner by means of a bar engaged radially on one of holes 14 provided in the nut.

For adjusting the position of the upper roller 2 with respect to the lower roller 1, there are provided two screw-threaded rods 17, 17a connecting the fixed frame 11 carrying the lower roller 1 and a movable frame 15 carrying the upper roller 2. This adjustment is made by rocking the movable frame 15 around pivots 27 carried by upright frame members 28. The screw-threaded rods 17, 17a are located on each side at the opposite end of the frame 15 from the pivots 27. The screw-threaded rods 17, 17a are pivotally and rotatably mounted on the fixed frame 11 by joints 19, 19a and co-operate with nuts 16, 16a rotatably mounted on the movable frame 15. At their upper ends, the screw-threaded rods carry operating cranks 18, 18a. On rotation of the cranks 18, 18a, the screw-threaded rods rotate freely in the joints 19, 19a on which they bear; at the same time, by means of the nuts 16, 16a, the screw-threaded rods produce rocking of the movable frame about the pivots 27.

One example of the type of application of the invention is the surface texturising of lungs. Normally, the lung cut into pieces has a very different appearance from beef. On the other hand, by passing frozen slices of 1.5 to 2 cm of dressed lung through the equipment described in the foregoing, it is possible to obtain an appearance very close to that of beef, that is to say, formed of muscle tissue.

A similar appearance has been obtained by texturising the surface of frozen slices of 1.5 to 2 cm of udder.

It is possible to carry out this operation on such non-fiberous meat and offal having a sufficiently firm texture, and it has been found that in some cases preliminary freezing is not necessary.

It is evident that some substances, such as the spleen, may be texturised on the surface, but in the course of cooking, destruction of the texture is produced, and the substances thus treated are therefore not suitable for canning but could be used in raw products.

It is also evident that mixtures of such non-fibrous meats and offal may be provided cooked in a form suitable for the equipment provided and finally surface treated.

Scalding in hot water often makes it possible to obtain, after surface texturising, a firmer product better adapted to canning. This, however, depends on the raw material used.

The following is an example of the practice of the invention.

The procedure and apparatus described above was used to carry out a test under the conditions and in the manner described in the following.

Slices of frozen lung 1.5 to 2.5 cm thick were passed between the two rollers 1 and 2 provided with circular blades or knives 3 and 4, respectively. The roller 1 passed below and the other roller 2 passed above the slice of lung placed on the table 10. The diameter of the circular knives 3 and 4 was 50 mm and the diameter of the roller on which the blades were fixed was 43 mm. The cutting blades consequently had a height of 3.5 mm. The knives were fixed at equal distances apart on the rollers, the spacing of the knives being 3 mm. The rollers were driven by the independent electric motors 6 and 8 at the same speed of 150 r.p.m.

It should be noted that the height of the circular knives may vary between 1 and 15 mm according to the substance being treated and the desired result, and the space between the circular knives, that is to say, the width of the annular spacers, may vary from 0.5 to 10 mm.

By varying these characteristics, cutting depths and surface appearance approaching as closely as possible the texture of muscle meat, depending on the treated substances, may be obtained.

Although initially mounted in a rigid manner, the rollers were in fact slightly mobile during the passage of the slices of frozen lung, owing to loose mechanical fixing. Nevertheless, this slight mobility of the rollers is not particularly important for producing the desired effect. The distance between the two rollers 1 and 2, not taking into account the mobility of the parts during the passage of the slices of lung, may vary from 1 to 2 cm. It depends on the thickness of the slice of lung.

The frozen lung was passed several times between the rollers. The first passage resulted in parallel surface incisions on each face of the slice and also a slight surface thawing.

On the second passage, an angle of approximately 30° was given to the direction of passage with respect to the first passage. This resulted in a series of fresh incisions intersecting the lines of the first impressions and resulting in further surface thawing.

A third passage between the rollers with a direction making an angle of approximately 30° with respect to the first passage was made but in an opposite direction to that of the second passage.

Finally, the slices of lung were passed a fourth time between the rollers parallel to the direction of the first passage.

After cooking and cooling, examination showed that the straight incisions resulting from the passage between the rollers had become irregular and the surface appearance was very close to that of freshly cooked beef. The irregularity resulting from cooking is probably the result of the coagulation of the proteins by the action of heat.

It should be noted that if the technique employed results in surface coagulation, this may or may not be an advantage, depending on whether the desired result of final texturising is enhanced or, on the contrary, is diminished.

The experiment described was carried out on frozen lung. Other substances may be used, depending on whether they retain their form and are not decomposed by cooking. Examples include offal, meats which do not have a satisfactory surface texture, mixtures of reshaped minced meat or any substance which retains its shape during its passage between the rollers.

It is of course understood that the invention is not by any means restricted to the specific examples of substances to be treated or of equipment for carrying out the process.

In particular, it is possible to use a number of pairs of rollers, four for example, arranged in series and served by conveyor belts, whose purpose is to orient the product in which the incisions are to be made for forming intersecting incisions, the products passing between the rollers of each pair thus receiving incisions in different directions.

We claim:

1. A process of imparting a fibrous meat textured appearance to the surface of shaped pieces about 1.5 to 2.5 cm thick of protein material selected from the group consisting of meat, offal, spleen, udder, lung and mixtures thereof having relatively smooth surfaces and no natural fibrous meat texture, comprising applying surface texturizing incisions to the surfaces of said pieces by cutting at least one series of parallel superficial incisions thereon conferring on the shaped protein pieces the appearance and structure of muscular tissue.

2. A process according to claim 1, which includes producing a plurality of series of incisions, with the incisions of one series crossing the incisions of another series.

3. A process according to claim 1 which also includes the preliminary step of freezing the said pieces.

4. A process according to claim 1, wherein said shaping consists of forming said pieces into slices having two substantially parallel faces.

5. A process according to claim 1, which also includes the subsequent step of cooking said material.

* * * * *

UNITED STATES PATENT OFFICE
CERTIFICATE OF CORRECTION

PATENT NO. : 3,924,011
DATED : December 2, 1975
INVENTOR(S) : Jean-Paul Kern, Jacques Lemarechal, Malcolm Desforges It is certified that error appears in the above-identified patent and that said Letters Patent are hereby corrected as shown below:

Column 1, line 45, after "supports" should be inserted--

--, or again by one or more series of hot needles or also by laser treatment--

Signed and Sealed this

Twenty-fourth Day of October 1978

[SEAL]

Attest:

RUTH C. MASON
Attesting Officer

DONALD W. BANNER
Commissioner of Patents and Trademarks